March 18, 1947. H. D. BURKHALTER, JR 2,417,406
CHANGE SPEED TRANSMISSION
Filed Jan. 17, 1945 3 Sheets-Sheet 1

INVENTOR.
HARRY D. BURKHALTER, JR.
BY
ATTORNEYS

March 18, 1947.   H. D. BURKHALTER, JR   2,417,406
CHANGE SPEED TRANSMISSION
Filed Jan. 17, 1945   3 Sheets-Sheet 2

INVENTOR.
HARRY D. BURKHALTER, JR.
BY
ATTORNEYS

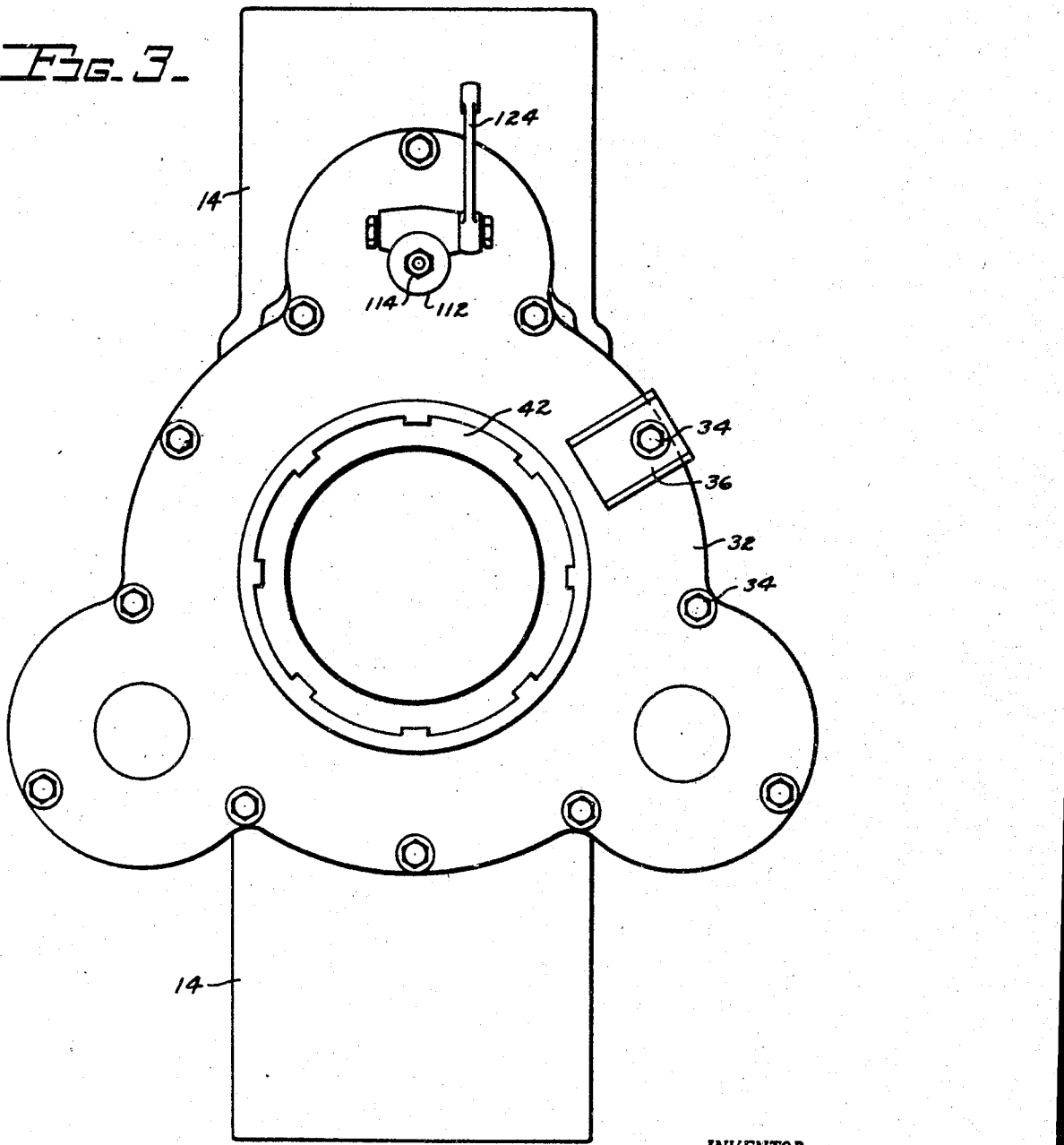

Patented Mar. 18, 1947

2,417,406

UNITED STATES PATENT OFFICE 2,417,406

CHANGE-SPEED TRANSMISSION

Harry D. Burkhalter, Jr., Bowling Green, Ohio

Application January 17, 1945, Serial No. 573,234

5 Claims. (Cl. 74—190.5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a change speed transmission for changing the pitch of aircraft propellers, and particularly, to mechanisms by which the blade pitch may be automatically controlled, the mechanism being of that type wherein power for making changes in the blade pitch is derived from the aircraft engine itself.

The function of a variable pitch propeller is to maintain a constant engine speed for any given power application, irrespective of flight attitude or air density. Whenever, therefore, for a given power application, the revolution speed of the engine is too low for best efficiency, the blade angle is decreased to allow the engine to speed up and whenever for a given power application, the revolution speed of the engine is too high for best efficiency, the blade angle is increased to bring the speed of the engine down to the selected normal.

It is therefore an object of this invention to provide an effective but inexpensive mechanism which will sense the need for a change in blade angle, measure the amount of the change, and automatically make the necessary change without the attention of the pilot.

In normal level flight, the necessary changes in pitch angle from one moment to the next are usually very slight, so that a mechanism which will respond fast enough to change pitch at a rate of several degrees per second is usually quite satisfactory for this purpose, yet many occasions arise where a sudden change in flight attitude or air density may require so considerable a change in blade angle that it is highly desirable to change to the new angle at a much faster rate.

To satisfy this condition, it has been proposed to provide a pitch changing mechanism with both a high and a low rate of pitch change, either of which may be made effective as the occasion may require. It has been found, however, in experimentation with these mechanisms that when the high rate of pitch change is effective it is practically impossible to arrest change within several degrees of the correct pitch angle, the mechanism either operating to stop short of the proper angle or to overrun the proper angle.

It is therefore another object of the invention to provide mechanism which will sense not only an off-speed condition, but will sense the magnitude of the off-speed condition, whereby a relatively low rate of pitch change will be had when the amount of the change required is small, and an appropriately higher rate of pitch change will be had when the amount of change is large, with an infinite number of intermediate ratios of pitch change which may vary by infinitesimal increments between the low rate and the high rate.

With such a mechanism, when a considerable change in pitch is indicated, the rate of change is first quite high but thereafter tapers off until, by the time that the proper pitch angle is reached, the rate of pitch change has tapered off to zero.

Other objects and advantageous features will become apparent as the accompanying description is considered with reference to the drawings wherein, Fig. 1 is a view, shown partly in vertical axial section and partly in elevation, through a propeller having pitch change mechanism which incorporates my improved change speed transmission.

Fig. 3 is a right-hand end view of Fig. 1.

Like reference characters refer to like parts throughout the drawings.

Figure 1:
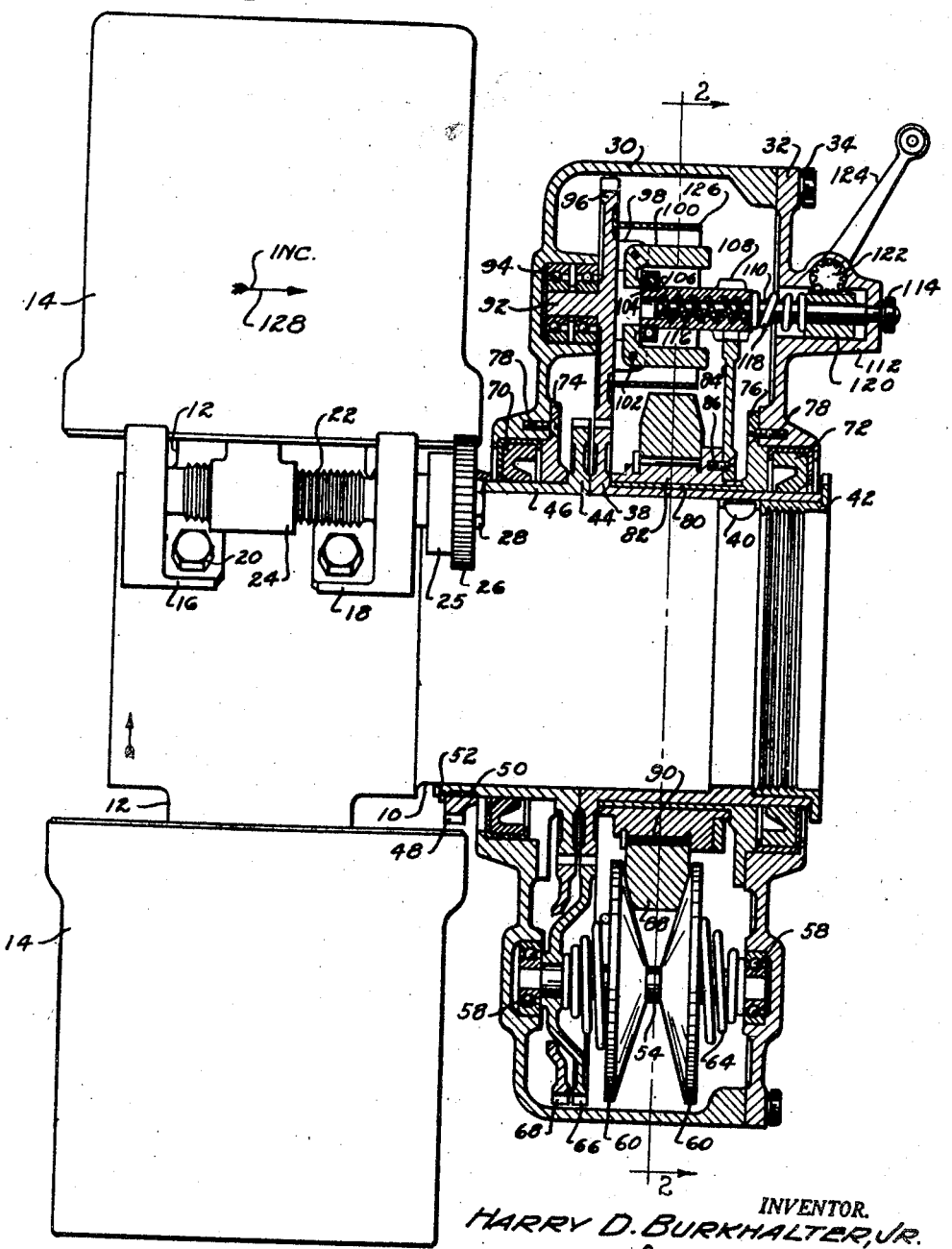

At its forward end a propeller hub 10 carries two oppositely extending bosses 12 upon which the ferrules 14 which hold the blade shanks are rotatable. Brackets 16 and 18, secured to the hub by bolts 20, rotatably support the pitch change screw 22. Nut 24 on the screw 22 has pin and slot connection (not shown) with the ferrules 14, whereby the ferrules are rotated one or the other direction as the nut is moved right or left by rotation of the screw. A friction clutch 25 has one friction member secured to the screw 22 by a nut 28, the other friction member being secured to a gear 26, whereby, when for any reason pitch change shall continue until the nut 24 abuts one of the brackets 16 or 18, the clutch will slip to avoid undue strain on the mechanism. The propeller hub 10 may be conventionally secured to the propeller shaft, which is not shown, since it forms no part of the invention. Parts 10 through 28 and the manner in which they are arranged are well known in the art.

The portion of the structure shown which constitutes my novel invention is supported within a housing 30 inclosed by a cover 32 held to the housing by screws 34, or the housing may take the form of an open frame, if so desired. A channel-shaped bracket 36 (see Fig. 3) is fastened by one of the screws 34 and is adapted to straddle a suitable lug on the engine nose to hold the housing 30 against rotation.

Within the housing 30 a gear 38 is secured to the hub 10 by a key 40 and a nut 42, whereby the gear 38 must always rotate at engine speed and may therefore preferably be called the driving gear of my change speed device. A second gear 44, which is free to rotate on the hub 10, has an elongated hub 46 which extends through and beyond the housing. The gear 44 may preferably be called the driven gear of my change speed device. A gear 48 held by a key 50 and spring ring 52 on the projecting end of the hub 46, is in constant mesh with the gear 26 on the pitch change screw 22.

Figure 2:
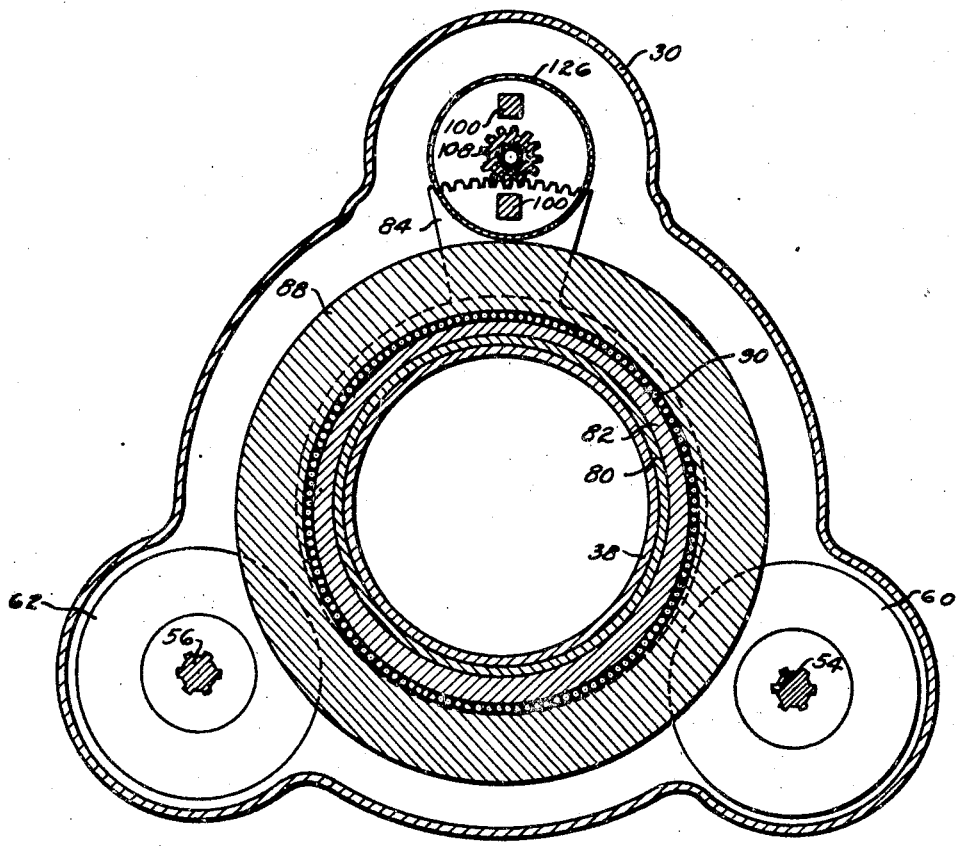
Fig. 2 is a transverse section taken at 2—2 of Fig. 1.

Two spaced apart countershafts 54 and 56, having bearings 58 at their ends are supported in the housing and cover. Countershafts 54 and 56 are splined intermediate the bearings to slidably fit V-pulleys 60 and 62 (see Fig. 2). Pulleys 60 and 62 are each divided into two parts, springs 64 being provided and positioned to urge the parts towards each other. The effective diameters of the pulleys are therefore increased or decreased as the pulley parts are moved together or are forced apart. A gear 66 is splined to the countershaft 54, and is in constant mesh with the driving gear 38. A gear 68 is splined to the countershaft 56 and is in constant mesh with the driven gear 44.

Packing rings 70 and 72 are provided to retain lubricant and to keep out foreign matter. Closing members 74 and 76, held in place by screws 78, keep the packing rings in place. An integral sleeve 80 extends axially from the closing member 76 and is therefore held against rotation, the hub of the gear 38 being freely rotatable in the sleeve.

An eccentric 82 is freely rotatable on the outside of the sleeve 80, and is rockable through part of a turn by a gear segment 84, the gear segment being attached to the eccentric by screws 86. A friction wheel 88 is free to rotate on an antifriction bearing 90 which is carried on the outside of the eccentric 82. The sides of the friction wheel are beveled to correspond to the conical surfaces of the pulleys 60 and 62.

Rocking of the eccentric 82 by means of the segment 84 so that the high side of the eccentric moves toward the pulley 60 and away from the pulley 62 decreases the effective diameter of the pulley 60 and increases the effective diameter of the pulley 62. Conversely, rocking the high side of the eccentric toward the pulleys 62, decreases the effective diameter of the pulley 62 and increases that of the pulley 60.

Within the housing and spaced between countershafts 54 and 56 is a third countershaft 92 which is rotatably supported in antifriction bearings 94. At its inner end, the countershaft 92 carries the gear 96 which is in constant mesh with the driving gear 38.

The inner face of the gear 96 is provided with ears 98 to which centrifugal weights 100 are hinged by pins 102. Weights 100 are of bell crank type of which the short arms rest upon an antifriction thrust bearing 104 carried on an elongated hub 106 of a pinion 108. The pinion 108 is carried on a long stud 110 which is nonrotatably secured in the outer wall of a hollow hub 112 by a nut 114 whereby the pinion is in constant mesh with the segment 84.

The bore of the hub 106 is provided with a helically disposed half-round groove, and the outside of the stud 110 is provided with a corresponding groove, the grooves being filled with a helical row of balls 116, whereby antifriction threaded engagement between hub 106 and stud 110 is provided.

A spring 118 rests against the pinion 108 urging it to the left. A collar 120, slidable axially within the hollow hub 112, receives the reaction of the outer end of the spring. Rack teeth are formed along one side of the collar 120 for engagement by a pinion 122, which is rotatable by the lever 124 to vary the tension of the spring 118.

A cylindrical shield 126 surrounds the governor weights 100, whereby the splashing of lubricant from the friction wheel 88 will not influence action of the governor. Shield 126 also acts as a stop for limiting outward movement of the weights, while the pinion hub 106 limits their inward movement. The pitch of the antifriction screw 116 is such that outward movement of the weights, from their neutral position shown, to their outer limit, turns the pinion 108 on the stud 110 about one-half turn anticlockwise viewed from the right-hand end, that is, from the pilot's seat, while inward movement of the weights from the position shown to their inner limit, turns the pinion on the stud about one-half turn clockwise, viewed from the same end, that is, from the pilot's seat. For purposes of description, when the term clockwise or anticlockwise is hereafter used, it shall be intended as viewed from the pilot's seat.

The operation of the device is substantially as follows:

For any given stress of the spring 118 there is a corresponding propeller speed at which the centrifugal weights 100 will assume the neutral position shown in Fig. 1. In this neutral position the pinions 108 and segment 84 hold the eccentric 82 in the midway position which causes the driving pulley 60 and the driven pulley 62 to have equal effective diameters, whereby the pitch remains in status quo.

It is noted, however, that the pulleys must be of equal effective diameter to maintain the pitch in status quo only, if the ratio of the gear 38 to the gear 66 is the same as the ratio of the gear 44 to the gear 68. When these gear ratios differ, compensation may be made by varying the pulley diameters. For purposes of illustration, it may be assumed that the ratio of the gear 38 to the gear 66 is the same as the ratio of the gear 44 to the gear 68, which requires that pulleys 60 and 62 be of equal effective diameter to maintain the zero rate of pitch change.

With gears and pulleys proportioned as above assumed, and the centrifugal weights in the midway position, the gear 38 which is fast on the propeller hub will drive the gear 44 which is free on the propeller hub at propeller speed. As long as gears 38 and 44 maintain exactly the same speed, the propeller blades will obviously not rotate about their axes. This state may be referred to as the equilibrium condition.

When the propeller overspeeds, the weights 100 swing out about the hinge pin 102 and the pinion 108 will be moved to the right, and, since the pinion has threaded connection with the nonrotatable stud 110, the pinion must rotate a fraction of a turn on the stud anticlockwise, which in turn will rotate the segment 84 clockwise, which will decrease the effective diameter of the pulley 60 and increase the effective diameter of the pulley 62, whereby the driven gear 44 will lose in clockwise rotative movement with respect to the driving gear 38, which will turn the gear 26 and screw 22 clockwise. The screw 22 being right hand will rotate the blade ferrule 14 in the direction of the arrow 128 whereby the blade pitch is increased to bring the propeller back down to normal speed. It will be obvious that when the propeller underspeeds, the reverse action will take place to bring it back up to speed.

Movement of the arm 124, to change the stress of the spring 118 merely changes the speed of rotation at which centrifugal members 92 come to the neutral position shown, the pulleys then being of equal diameter and the blades at zero rate of pitch change. Should pitch adjustment, either for increase or for decrease, continue beyond desired limits, the nut 24 will encounter one of the brackets 16 or 18 and the clutch 25 will slip momentarily until the condition is corrected.

Having described an embodiment of my invention, I claim:

1. An improved change speed transmission which comprises a driving member, a driven member, two countershafts having axes parallel with the driving member axis, means drivably connecting one countershaft to the driving member, means drivably connecting the other countershaft to the driven member for rotating said driven member, a V pulley on each countershaft, each divided into halves on a plane normal to its axis, resilient means urging the halves axially toward each other, a friction wheel having its axis parallel to the driving member axis and having beveled side faces corresponding to the V of the pulleys, said beveled faces extending between said halves to hold them apart, and means to move the axis of said friction wheel toward one pulley and away from the other.

2. An improved change speed transmission which comprises a driving member, a driven member, two countershafts having axes parallel with the driving member axis, means drivably connecting one countershaft to the driving member and means drivably connecting the other countershaft to the driven member for rotating said driven member, a V pulley on each countershaft, each divided into halves on a plane normal to its axis, resilient means urging the halves axially toward each other, a friction wheel surrounding said driving member having beveled side faces corresponding to the V of said pulleys and having its axis parallel to the driving member axis, said beveled faces extending between said halves to hold them apart and an eccentric collar between said driving member and said friction wheel rockable to move the axis of said friction wheel toward one pulley and away from the other.

3. An improved change speed transmission which comprises a driving member, a driven member, two countershafts, means drivably connecting one countershaft to the driving member, means drivably connecting the other countershaft to the driven member for rotating said driven member, a V pulley on each countershaft each divided into halves on a plane normal to its axis, resilient means urging the halves axially toward each other, a friction wheel having beveled side faces corresponding to the V of said pulleys, said beveled faces extending between said halves to hold them apart, and a speed responsive device for moving the axis of said friction wheel toward one pulley and away from the other.

4. An improved change speed transmission which comprises a driving member, a driven member, two countershafts having axes parallel with the driving member axis, means drivably connecting one countershaft to the driving member, means drivably connecting the other countershaft to the driven member for rotating said driven member, a V pulley on each countershaft, each divided into halves on a plane normal to its axis, resilient means urging the halves axially toward each other, a friction wheel surrounding said driving member, an eccentric between said friction wheel and said driving member, a gear segment on said eccentric for rocking the high side of said eccentric toward one of said pulleys and away from the other, a pinion rotatable in one or the other direction for rocking said segment, and a speed responsive means operative above a selective speed to rotate the pinion in one direction and below said selected speed to rotate the pinion in the other direction.

5. The device of claim 4, wherein there is a nonrotatable screw having threaded engagement with said pinion and wherein said speed responsive device consists of centrifugal weights operative above a selected speed to move said pinion axially in one direction on said screw to rotate said pinion in one direction, and operative below said selected speed to move said pinion axially in the other direction on said screw to rotate said pinion in the other direction.

HARRY D. BURKHALTER, Jr.

REFERENCES CITED

The following references are of record in the file of this patent:

UNITED STATES PATENTS

| Number | Name | Date |
| --- | --- | --- |
| 1,806,984 | Prout | May 26, 1931 |
| 2,164,489 | Berliner | July 4, 1939 |
| 2,196,654 | Bertran | Apr. 9, 1940 |
| 2,216,642 | Davis | Oct. 1, 1940 |
| 2,222,281 | Beier | Nov. 19, 1940 |
| 2,253,750 | Beier | Aug. 26, 1941 |
| 2,284,154 | Lampton | May 26, 1942 |
| 2,365,676 | Burkhalter | Dec. 26, 1944 |
| 666,064 | Nordberg | Jan. 15, 1901 |
| 2,356,772 | Magee | Aug. 29, 1944 |

FOREIGN PATENTS

| Number | Country | Date |
| --- | --- | --- |
| 257,792 | British | Sept. 9, 1926 |